US012794969B2

(12) United States Patent
Kuno et al.

(10) Patent No.: US 12,794,969 B2
(45) Date of Patent: Nov. 10, 2026

(54) OPERATIONS ON DATA FOR COMMANDS IN INTERACTIVE PROGRAMMING SESSIONS

(71) Applicant: HEWLETT PACKARD ENTERPRISE DEVELOPMENT LP, Spring, TX (US)

(72) Inventors: Harumi Kuno, Cupertino, CA (US); John L. Byrne, Pasadena, CA (US); Paolo Faraboschi, Sant Cugat (ES); Sharad Singhal, Belmont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 491 days.

(21) Appl. No.: 18/494,960

(22) Filed: Oct. 26, 2023

(65) Prior Publication Data

US 2024/0406251 A1 Dec. 5, 2024

Related U.S. Application Data

(60) Provisional application No. 63/505,483, filed on Jun. 1, 2023.

(51) Int. Cl.

| | |
|---|---|
| ***H04L 67/10*** | (2022.01) |
| ***G06F 8/33*** | (2018.01) |
| ***G06F 9/455*** | (2018.01) |
| ***G06F 9/54*** | (2006.01) |

(52) U.S. Cl.

CPC ................ *H04L 67/10* (2013.01); *G06F 8/33* (2013.01); *G06F 9/45512* (2013.01); *G06F 9/544* (2013.01); *G06F 9/547* (2013.01); *G06F 2209/547* (2013.01); *G06F 2209/549* (2013.01)

(58) Field of Classification Search

CPC ................................ H04L 67/10; G06F 3/067

See application file for complete search history.

(56) References Cited

U.S. PATENT DOCUMENTS

2018/0081798 A1* 3/2018 Alcantara ........... G06F 12/0246
2021/0173714 A1* 6/2021 Huang .................. G06F 16/148

OTHER PUBLICATIONS

Beginning Apache Spark, Apress, ISBN-13 (electronic): 978-1-4842-3579-9, 2018 (Year: 2018).*

Srowen, p. 4, My Clouderra, Aug. 18, 2015, https://community.cloudera.com/t5/Support-Questions/Share-1-RDD-between-2-Spark-applications-memory-persistence/m-p/30807#:~:text=If%20both%20my%20applications%20works,maintain%20fault%20tolerance%20across%20apps. (Year: 2015).*

(Continued)

*Primary Examiner* — Hau H Hoang

(74) *Attorney, Agent, or Firm* — Trop, Pruner & Hu, P.C.

(57) ABSTRACT

In some examples, a system having a plurality of computer nodes receives a command based on program code of a program being developed in an interactive programming session. The system distributes data items from a network-attached memory to a distributed data object having data in node memories of the plurality of computer nodes. A dataset manager performs an operation specified by the command on the distributed data object, the operation executed in parallel on the plurality of computer nodes. The dataset manager produces derived data generated by the operation on the distributed data object, the derived data accessible by a programmer in the interactive programming session.

20 Claims, 10 Drawing Sheets

100

(56) References Cited

OTHER PUBLICATIONS

Spark Streaming: Dynamic Scaling and Backpressure in Action by Priya Matpadi, Oct. 7, 2018 (Year: 2018).*
CacheLib', available online at <https://web.archive.org/web/20221006141723/https://cachelib.org/>, Oct. 6, 2022, 2 pages.
Github, "facebook / CacheLib", available online at <https://web.archive.org/web/20210903060800/https://github.com/facebook/CacheLib>< Sep. 3, 2021, 3 pages.
IBM Cloud, "TidalScale Software-Defined Servers", available online at <https://cloud.ibm.com/catalog/content/node-red-operator-certified::2-7650c9f1-28ba-404e-a2bb-f898466ee6e1-global>, Oct. 2022, 4 pages.
Tidalscale, "Advances in Virtualization in Support of In-Memory Big Data Applications", 2015, 27 Pages.
Timothy Prickett Morgan, "Meta Platforms Hacks CXL Memory Tier Into Linux", available online at <https://www.nextplatform.com/2022/06/16/meta-platforms-hacks-cxl-memory-tier-into-linux/><, Jun. 16, 2022, 10 pages.
Amitha C, Extending Chapel to Support Fabric Attached Memory, 2022 (3 pages).
Arkouda, Arkouda (a????da): NumPy-like arrays at massive scale backed by Chapel, 2020 (10 pages).
Arkouda, Arkouda: Data Science at Massive Scales and Interactive Rates, Feb. 2020 (35 pages).
Breitenfeld et al., ECP, Achieving High Performance I/O with HDF5, Feb. 2020 (118 pages).
Chamberlain et al., Chapel Comes of Age: Making Scalable Programming Productive, 2018 (16 pages).
Keeton et al., The OpenFAM APIAPI: a programming model for disaggregated persistent memory, 2018 (26 pages).
Merrill et al., Abstract: Interactive data exploration backed by Chapel, 2019 (3 pages).
Open Fabrics Alliance, OFA Workshop 2018 to Open with Keynote from Intel's BillMagro; Workshop Abstracts and Agenda Now Available, Mar. 2018 (2 pages).
Openfam Reference Implementation, May 30, 2023 (4 pages).
Peng et al., Enabling Scalable and Extensible Memory-mapped Datastores in Userspace, Feb. 2021 (14 pages).
Wahlgren et al., Evaluating Emerging CXL-enabled Memory Pooling for HPC Systems, Nov. 2022 (10 pages).

* cited by examiner

OPERATIONS ON DATA FOR COMMANDS IN INTERACTIVE PROGRAMMING SESSIONS

CROSS REFERENCE TO RELATED APPLICATION

This application claims the benefit under 35 U.S.C. § 119 (e) of U.S. Provisional Patent Application No. 63/505,483, entitled "Data Management for Fabric-Attached Memory," filed Jun. 1, 2023, which is hereby incorporated by reference.

This invention was made with government support under Contract Number H98230-15-D-0022/0003 awarded by the Maryland Procurement Office. The Government has certain rights in the invention.

BACKGROUND

Programs including machine-readable instructions can be executed in computer systems. A program can be written using any of various different programming languages. The source code for a program can be compiled by a compiler into machine executable code for execution. Alternatively, the source code of a program can be executed by an interpreter without first performing compilation.

BRIEF DESCRIPTION OF THE DRAWINGS

Some implementations of the present disclosure are described with respect to the following figures.

Figure 1:
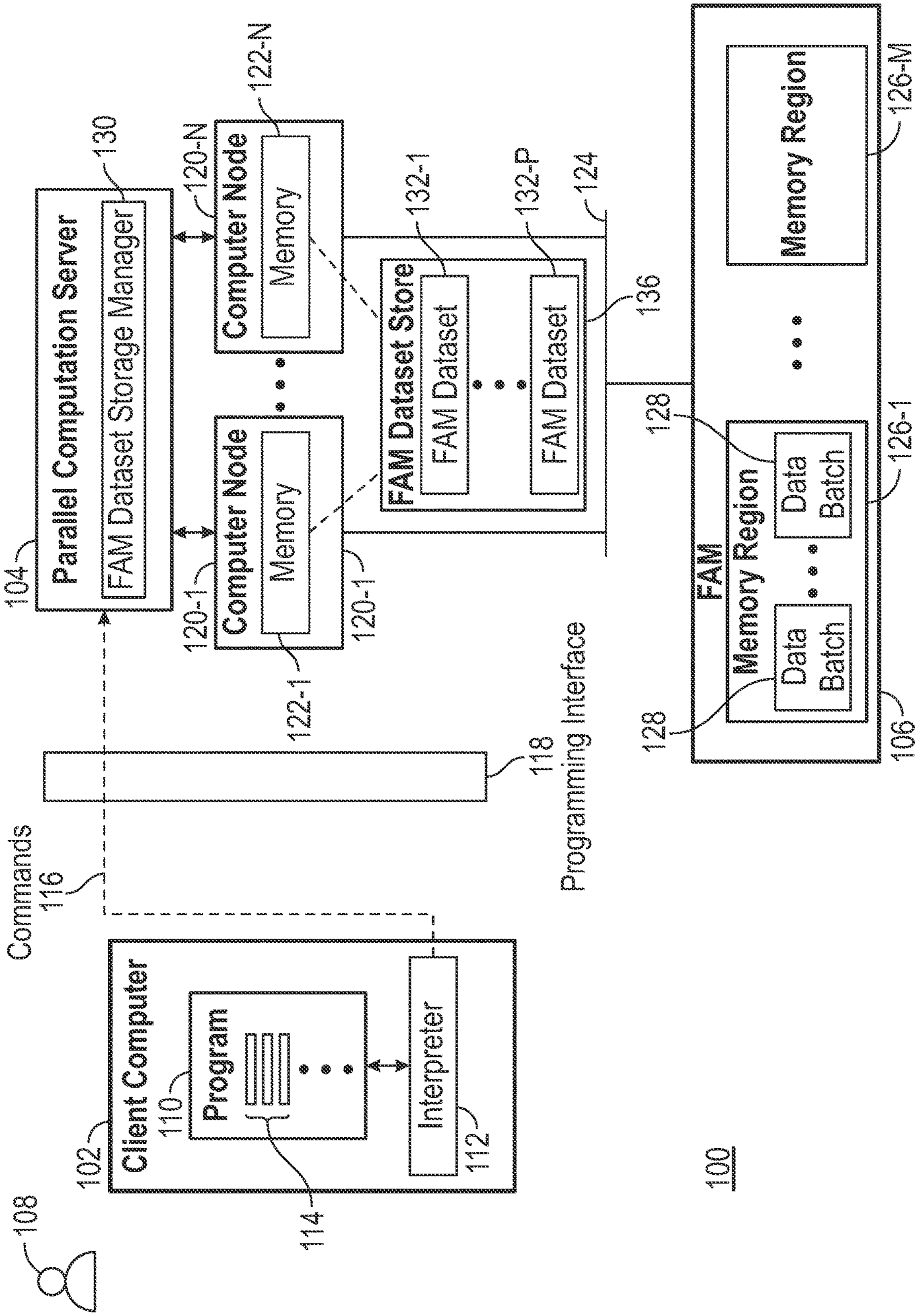
FIG. 1 is a block diagram of an arrangement including a client computer, a parallel computation server executed on computer nodes, and a fabric attached memory (FAM), according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Some programming languages support an interactive mode in which lines of code of a program can be executed as the lines of code are added by a programmer. An example of such a programming language is Python. The lines of code can be executed individually or in batches during an interactive programming session as the programmer creates the lines of code. During the interactive programming session, a line of code can be executed with respect to data stored in a memory. As the amount of data on which operations are to be applied increases (such as operations associated with data mining, data analytics, artificial intelligence, or other operations), programmers may face challenges associated with timely execution of the operations on large amounts of data. In some cases, a cluster of computer nodes can be provided to increase processing capacity. However, the data on which any given operation is to be applied may not fit into a local memory of a single computer node. As a result, programmers may face challenges associated with how data is to be distributed and managed across local memories of multiple computer nodes. Additionally, it may be challenging to share result data derived by an operation applied on base data, such as with other programmers. Furthermore, it can be challenging to decide how many computer nodes to allocate to a programmer for an interactive programming session because it can be difficult to predict what operations will be executed in the interactive programming session and the amount of data that any of the operations will process or generate. Moreover, different operations that the programmer executes during an interactive session may have different characteristics and thus have different requirements for processing them efficiently.

In accordance with some implementations of the present disclosure, a system including multiple computer nodes executes a manager that has the following roles: (1) the manager acts as a server for a program being written during an interactive programming session, such as in a remote computer that is remote from the system, and (2) the manager acts as a client with respect to a network-attached memory (also referred to as a "fabric attached memory" or FAM). Such a manager is referred to as a "FAM dataset storage manager" below. Commands for lines of code are issued from the remote computer on which the program is being developed to the manager, which manages parallel execution of operations for the commands across multiple computer nodes. In addition, in its role as a client with respect to the FAM, the manager is able to interact with the FAM to copy data items from the FAM to a distributed data object including base data distributed across memories of the computer nodes. Derived data produced by an operation applied to the base data of the distributed data object is stored by the manager to the FAM. The derived data is subject to automatic incremental updates as additional base data is received. Additionally, the manager supports sharing of base data and derived data with other entities, such as other programmers in other interactive programming sessions or programs executed non-interactively (e.g., a scheduled job).

In addition, multiple managers may contribute to the execution of a single operation by executing upon different parts of the same dataset. These managers can operate concurrently, thereby increasing the parallelism with which the operation is executed. Furthermore, more (or fewer) managers can contribute to executing a given operation, depending on the characteristics of the operation to be executed.

Using techniques or mechanisms according to some examples of the present disclosure, an improvement in the technology of interactive programming when working with large datasets can be achieved. As part of development of a program, lines of code can be executed in an interactive programming session that are applied on large datasets stored in a FAM. Data from a large dataset can be retrieved by the manager from the FAM into local memories of computer nodes, and operations corresponding to the lines of code are executed on the data distributed across the local memories of the computer nodes. The operations can produce derived data that is accessible by a programmer of the program, and that can be shared with other entities, such as other programmers.

FIG. 1 is a block diagram of an example arrangement 100 that includes a client computer 102, a collection of server computer nodes 120-1 to 120-N (N≥ 2) to execute operations of one or more workloads initiated from the client computer 102, and a FAM 106 storing data processed by the workloads. The client computer 102 may be physically coupled to the computer nodes 120-1 to 120-N over a network, which can include a local area network (LAN), a wide area network (WAN), a public network such as the Internet, or any other type of communication link.

In other examples, other arrangements of components different from the arrangement 100 can be employed. Also, although some examples discussed in the present disclosure refer to use of Python, Arkouda, and Chapel, it is noted that in other examples other programming languages and other server programs that support parallel execution of operations across computer nodes during an interactive programming session may be employed.

The FAM 106 is implemented using a collection of memory devices including nonvolatile memory devices or volatile memory devices, or both nonvolatile and volatile memory devices. Examples of memory devices include any or some combination of the following: a dynamic random access memory (DRAM) device, a static random access memory (SRAM) device, a flash memory device, or any other type of memory device.

In further examples, the FAM 106 can include a collection of memory nodes, where a memory node can include a memory server and one or more memory devices. The memory server in a memory node manages the access of data in the one or more memory devices of the memory node.

The FAM 106 can be accessed by processes executing in the computer nodes 120-1 to 120-N using remote direct memory access (RMDA). The computer nodes 120-1 to 120-N are coupled to the FAM 106 over an interconnect 124. RDMA allows a first computer, such as one of the computer nodes 120-1 to 120-N, to access a memory of a second computer, such as a computer of the FAM 106, without involving an operating system (OS) or main processor of the second computer. Examples of the interconnect 124 can include any of the following: a COMPUTE EXPRESS LINK (CXL) interconnect, a Slingshot interconnect, an InfiniBand interconnect, or any high throughput, low-latency interconnect.

A programmer 108 may develop a program 110 at the client computer 102. In some examples, the program 110 is according to the Python programming language. In other examples, the program 110 can be according to a different programming language that supports an interactive mode in which lines of code 114 of the program 110 are executed as the program 110 is being written (developed) by the programmer 108.

Although FIG. 1 shows just one client computer 102, in other examples, there may be multiple client computers, which may be associated with different programmers.

A "client computer" can refer to any or some combination of a desktop computer, a notebook computer, a tablet computer, a smartphone, or any other electronic device that supports interactive use by a user. A "server computer node" (or more simply, a "computer node") can refer to any of a desktop computer, a notebook computer, a tablet computer, a smartphone, a server computer, a communication node (e.g., a switch, a router, a gateway, or another type of communication node), or any other type of electronic device.

A "line of code" of a program can refer to any portion of the program that can be individually executed. For example, a line of a code can include a program statement or a collection of multiple program statements.

In some examples, the collection of computer nodes 120-1 to 120-N can execute a program that supports parallel execution of operations across multiple computer nodes. For example, the program can include a parallel computation server 104 that can execute across multiple computer nodes. In some examples, the parallel computation server 104 is a Chapel-based Arkouda server. Chapel is an open-source programming language that supports parallel computing. A program written using Chapel can be run in a distributed computer system that includes multiple computer nodes, such as the computer nodes 120-1 to 120-N.

Although FIG. 1 shows just one parallel computation server 104, in other examples, multiple parallel computation servers (e.g., multiple Arkouda servers) can execute across multiple computer nodes. In such examples, different Arkouda servers may execute on corresponding different subsets of computer nodes. For example, a first Arkouda server can execute on a first subset of computer nodes and a second Arkouda server can execute on a second subset of computer nodes. The first subset of computer nodes may include a computer node that is not part of the second subset of computer nodes, and vice versa. The first and second subsets of computer nodes may share at least one computer node. Alternatively, the first and second subsets of computer nodes do not share any computer node. As used here, a "subset" of computer nodes can refer to a single computer node or multiple computer nodes.

Some software packages allow a user to interactively issue parallel computations on distributed data (in the form of data arrays such as pdarrays). An example of such a software package is an Arkouda software package written using Chapel. A data array is an example of a distributed data object that can be distributed across computer nodes.

The computational heart of Arkouda is a Chapel interpreter that accepts a predefined set of commands from a client and uses Chapel's built-in capabilities for multi-locale and multithreaded execution. Multi-locale execution refers to execution across multiple processing locales, where a "processing locale" refers to any distinct computation partition, such as a computer node or a portion of the computer node including resources of the computer nodes 120-1 to 120-N. An example of a processing locale is a Chapel locale. In the example of FIG. 1, a processing locale can refer to one computer node, a portion of the computer node (e.g., a set of processors or a set of processor cores), or a collection of computer nodes. As used here, a "collection" of items can refer to a single item or to multiple items.

In the example of FIG. 1, the client of the parallel computation server 104 is the program 110 (e.g., written with Python) that is interpreted by an interpreter 112 (e.g., a Python interpreter) in the client computer 102. If the parallel computation server 104 is an Arkouda server, the program 110 is an Arkouda client.

Arkouda supports high performance computing (HPC) in the context of an interactive session in which a human (e.g., the programmer 108 of FIG. 1) may be involved as part of data operations. Arkouda provides a front end that supports interactive programming, such as a front end (including a user interface) that supports Python programming. The front end can be used by the programmer 108 to develop the program 110. An example of a platform that provides a front end for Python programming or other types of interactive programming is a Jupyter platform. In other examples, other platforms that provide front ends supporting interactive programming can be employed.

In accordance with some implementations of the present disclosure, the parallel computation server 104 includes a FAM dataset storage manager 130. The FAM dataset storage manager 130 allows programmers (such as the programmer 108 at the client computer 102) to work interactively with data residing in memories of computer nodes, such as local memories 122-1 to 122-N of the respective computer nodes 120-1 to 120-N. A "local memory" of a computer node can refer to a memory that is part of the computer node or that is accessible by the computer node over a relatively high speed link, with an access latency that is lower than an access latency for accessing data from the FAM 106 over the interconnect 124. The FAM dataset storage manager 130 allows a programmer, such as the programmer 108, in an interactive programming session to employ the FAM 106 in operations applied on datasets that are too large to fit into the local memories of a cluster of computer nodes. Examples of the operations include high performance computing (HPC) operations that are part of computationally demanding workloads, such as workloads associated with artificial intelligence (AI), machine learning, data analytics, or other operations applied on relatively large volumes of data or that involve complex computations. The use of a FAM allows the programmer to more efficiently use resources, such as resources of the computer nodes 120-1 to 120-N of FIG. 1, in performing the HPC workloads.

A programming interface 118 (or more specifically, an application programming interface or API) can be provided between a front end such as the client computer 102 and a computation backend such as the parallel computation server 104 that can execute operations initiated by a client (e.g., the program 110) across multiple computer nodes. In some examples, the programming interface 118 is an Arkouda programming interface.

As lines of code 114 of the program 110 are processed by the interpreter 112, corresponding commands 116 are sent by the client computer 102 through the programming interface 118 to the parallel computation server 104 for triggering operations across the computer nodes 120-1 to 120-N.

A command issued by the client computer 102 (or a collection of commands from the client computer 102) can cause the parallel computation server 104 to execute operations across computer nodes. The parallel computation server 104 can distribute the operations across the computer nodes to execute the operations in parallel.

In accordance with some implementations of the present disclosure, the FAM dataset storage manager 130 in the parallel computation server 104 that runs on the computer nodes 120-1 to 120-N can work on data that is stored in the FAM 106. Data in the FAM 106 can be copied (such as in response to inputs by the programmer 108 in an interactive programming session) to the local memories 122-1 to 122-N of the respective computer nodes 120-1 to 120-N. The inputs can be in the form of the lines of code 114 added to the program 10 by the programmer 108.

Examples of operations that can be invoked by the commands 116 issued based on the lines of code 114 in the program 110 include a data filter operation, a data scatter operation, a data gather operation, a data sort operation, or other types of operations that are applied on data in the FAM 106.

In some examples, the FAM dataset storage manager 130 can also store information representing workflows including operations invoked by the commands 116 from the client computer 102. For example, the information representing workflows includes information of the commands that triggered the operations of the workflows, and the data on which the commands are applied. By storing information representing workflows, the FAM dataset storage manager 130 supports suspend-and-resume and recovery-from-failure functionalities. A suspend-and-resume functionality refers to the ability of the FAM dataset storage manager 130 to suspend a workflow (or an operation in the workflow) and resume from the last known state of the workflow (or operation) using the information representing the workflow that has been suspended. A recovery-from-failure functionality refers to the ability of the FAM dataset storage manager 130 to recover from a workflow (or an operation in the workflow) if the workflow (or operation) failed.

The FAM dataset storage manager 130 in the parallel computation server 104 acts as a client (referred to as a "FAM client") of the FAM 106. The FAM dataset storage manager 130 is able to access the FAM 106 using a FAM programming interface, such as a FAM API. The FAM programming interface includes functions (also referred to as routines or methods) that can be invoked by processes running in the computer nodes 120-1 to 120-N (including processes of the parallel computation server 104) to manage access to the FAM 106. In some examples, the FAM programming interface includes an OpenFAM API.

Examples of functions of the FAM programming interface can include a memory allocation function that is invoked by a process to allocate a memory region in the FAM 106. In the example of FIG. 1, memory regions 126-1 to 126-M have been allocated, where $M \geq 1$. A "memory region" of the FAM 106 can refer to any portion of the FAM 106. A memory region can include a contiguous portion of the FAM 106, or alternatively, a memory region can include a collection of non-contiguous portions of the FAM 106. A memory region can span storage areas of multiple memory devices (or can include storage area(s) of just one memory device).

The allocated memory region may be accessible by multiple computer nodes (120-1 to 120-N) (this memory region can be shared by the multiple computer nodes). Multiple memory regions can be allocated in the FAM 106.

The FAM programming interface also includes a memory deallocation function to deallocate a memory region in the FAM 106. Other functions of the FAM programming interface include a put function to write data, a get function to read data, a gather function to gather data, a scatter function to scatter data, a copy function to copy data, functions that perform atomic operations (e.g., fetch-and-add, compare-and-swap, or other atomic operations), or other types of functions. The FAM programming interface also includes a map function to map a data item in the FAM 106 to a virtual address space of a process (e.g., a process of the FAM dataset storage manager 130). The FAM programming interface further includes an unmap function to unmap a data item from the virtual address space of a process.

Since the FAM 106 is associated with higher latency than the local memories 122-1 to 122-N of the computer nodes 120-1 to 120-N, the FAM dataset storage manager 130 copies data from the FAM 106 to the local memories so that more efficient processing of the data can be performed by operations triggered by the commands 116 issued by the program 110 (client) to the parallel computation server 104.

The data in the FAM 106 is distributed across the local memories 122-1 to 122-N (or a subset of the local memories 122-1 to 122-N). As an example, the FAM dataset storage manager 130 (in its role as a FAM client) is able to issue a call of a gather function through the FAM programming interface to collect values from one or more data batches 128 of data stored in the memory region 126-1 (or data batches of another memory region) into one or more local memories of the computer nodes 120-1 to 120-N. A "data batch" stored in the FAM 106 can refer to a specified unit of data or metadata that can be individually accessed, such as by the FAM dataset storage manager 130.

The data batches 128 contain data and metadata. The data in a data batch 128 includes data produced by a user, a program, a machine, or any other entity. Metadata includes information about the data. Examples of metadata are discussed further below.

The FAM dataset storage manager 130 organizes the data batches 128 into FAM datasets 132-1 to 132-P, where P≥ 1, which are stored across the local memories 122-1 to 122-N of the computer nodes 120-1 to 120-N. Data of a FAM dataset may be distributed across multiple local memories. A FAM dataset represents a logical integrated view of a collection of related data batches of data that have accumulated in the FAM 106 over time. The FAM dataset 132-1 contains data of related data batches 128 in the memory region 126-1, and the FAM 132-P contains data of other related data batches 128 in the memory region 126-1. Data batches are "related" if the data batches are the subject of one or more operations requested to be performed by the parallel computation server 104.

The FAM datasets 132-1 to 132-P are contained in a FAM dataset store 136, which stores FAM datasets including data of a particular memory region. For example, the FAM dataset store 136 contains FAM datasets of data in the memory region 126-1 of the FAM 106. Other FAM dataset stores (not shown) may be provided that contain data of other memory regions of the FAM 106. A FAM dataset store is a logical store through which a programmer (e.g., the programmer 108) is able to view data on which operations are to be applied. Operations invoked on computer nodes in response to the commands 116 from the client (the program 110) are also applied on data of the FAM dataset store, which can be distributed across local memories of computer nodes.

A FAM dataset may have an arrangement that is similar to an Arkouda DataFrame, which refers to a data structure that arranges data into multiple columns. Each column of a DataFrame contains an Arkouda parallel distributed array object, referred to as a pdarray object (or more simply a "pdarray"). A programmer (e.g., 108) is able to work with pdarray objects arranged as columns of an Arkouda DataFrame. In other words, the lines of code 114 in the program 110 developed by the programmer may include references to pdarray objects.

To support operations on data in the FAM datasets, which can be in the form of data arrays such as pdarrays, the programming language (e.g., Python) of the program 110 can include a data array class (e.g., a pdarray class) that can be included in program statements of the lines of code 114 that trigger operations on data arrays. An instance of a data array class represents an in-memory data array (e.g., a pdarray) of a FAM dataset stored in a local memory of a computer node.

In some examples, instead of a single FAM dataset storage manager, multiple FAM dataset storage managers may cooperate in an operation to operate on different parts of a FAM dataset. For example, a first FAM dataset storage manager executed on a first subset of computer nodes can apply the operation on a first part of the FAM dataset, and a second FAM dataset storage manager executed on a second subset of computer nodes can apply the operation on a second part of the FAM dataset. These FAM dataset storage managers can operate concurrently, thereby increasing the parallelism with which the operation is executed. Furthermore, more (or fewer) FAM dataset storage managers can contribute to executing a given operation, depending on the characteristics of the operation to be executed. For example, a scatter or gather operation may be efficiently handled by multiple FAM dataset storage managers. However, if a FAM dataset is not too large (e.g., smaller than a specified threshold), then it may be more efficient to apply a sort operation on the FAM dataset using a single FAM dataset storage manager rather than multiple FAM dataset storage managers.

Techniques according to some examples of the present disclosure can decide how many computer nodes 120-1 to 120-N to allocate to a programmer (e.g., the programmer 108) for an interactive programming session, such as by taking into consideration the amount of data that the programmer plans to process and what operations they plan to execute. For example, if the programmer plans to perform a sort operation on a very large amount of data, that operation can be executed more quickly using a larger number of computer nodes equipped with a large amount of memory than using a smaller number of computer nodes equipped with a small amount of memory.

Techniques according to some examples of the present disclosure can decide what kind of computer resources to allocate, such as by taking into consideration characteristics of operations the programmer intends to execute. For example, some operations may execute more quickly on a graphics processing unit (GPU) than on a central processing unit (CPU), so allocating computer nodes that are equipped with GPUs may result in faster execution time.

Example FAM Datasets and Operations on the FAM Datasets

Figure 2:
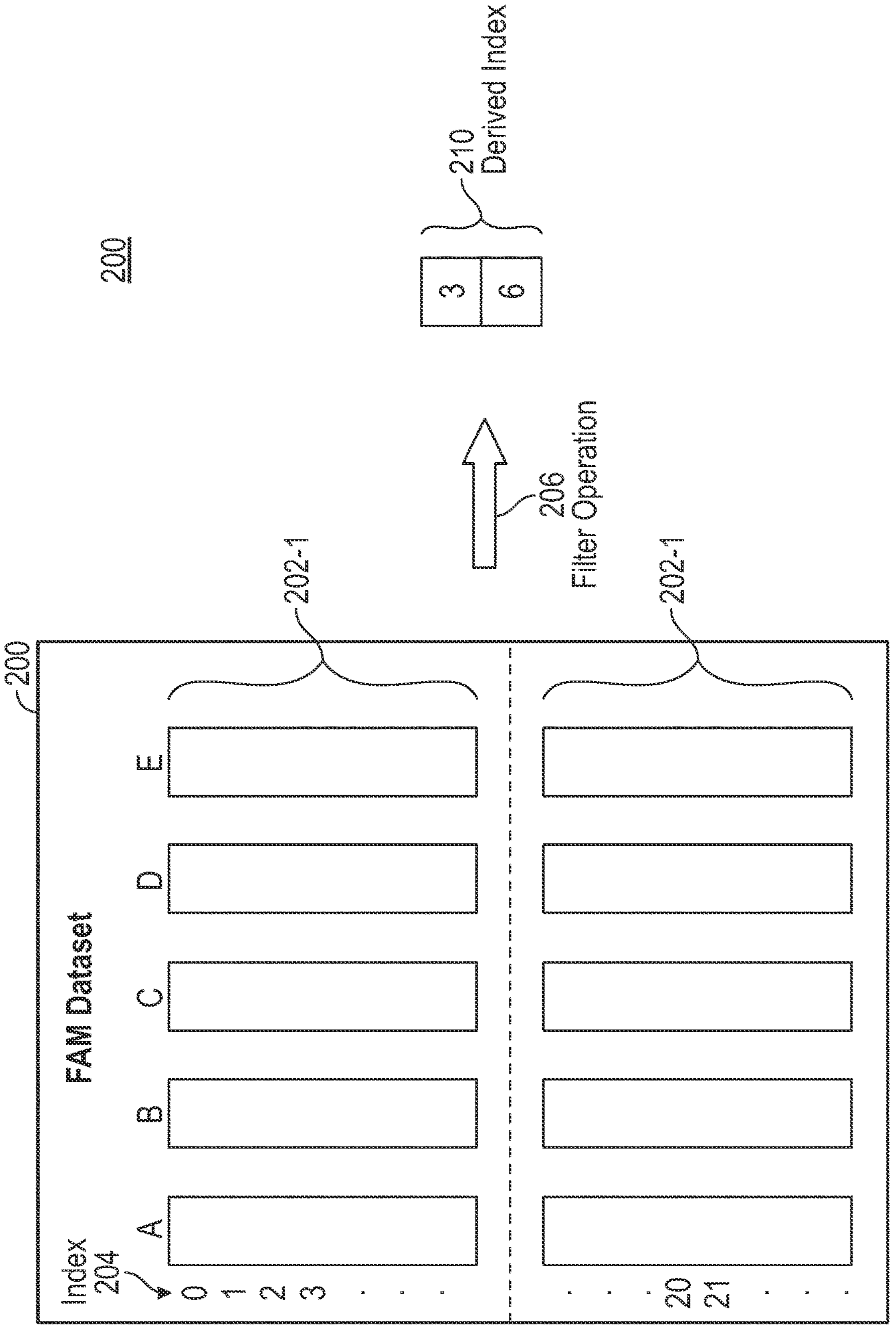
FIG. 2, FIG. 3, and FIG. 4 depict operations applied on FAM datasets, according to some examples.

In accordance with some examples of the present disclosure, pdarray objects are arranged as columns in a FAM dataset. FIG. 2 shows an example process 200 involving a FAM dataset 200 that contains data from two data batches in a memory region (e.g., 126-1 in FIG. 1) of the FAM 106. A first portion 202-1 of the FAM dataset 200 contains data from a first data batch, and a second portion 202-2 of the FAM dataset 200 contains data from a second data batch. A given column of the FAM dataset 200 may a pdarray object containing data values of a respective attribute. The FAM dataset 200 includes five columns (pdarray objects) representing attributes A, B, C, D, and E. The FAM dataset 200 also includes an index 204. In an example, the index 204 has values 0, 1, 2, . . . , 20, 21, . . . that refer to respective rows of the FAM dataset 200. In other examples, the index 204 can include other values to identify respective rows of the FAM dataset 200.

Generally, a FAM dataset includes an index (e.g., 204 in FIG. 2) and a set of columns that are identified by column names (e.g., A, B, C, D, and E in FIG. 2). The index of the FAM dataset includes data values that refer to rows of the FAM dataset. The index can be used to retrieve rows of data from the FAM dataset.

A pdarray object represents a collection of physical in-memory data arrays (data arrays stored in the local memories 122-1 to 122-N). In the example of FIG. 2, a pdarray object containing data values of attribute A can be distributed across the local memories of computer nodes, a pdarray object containing data values of attribute B can be distributed across the local memories of the computer nodes, a pdarray object containing data values of attribute C can be distributed across the local memories of the computer nodes, a pdarray object containing data values of attribute D can be distributed across the local memories of the computer nodes, and a pdarray object containing data values of attribute E can be distributed across the local memories of the computer nodes.

A programmer can cause application of various operations on the pdarray objects contained in a FAM dataset. The operations applied on the pdarray objects produce results as new, derived pdarray objects. If the parallel computation server 104 is an Arkouda server, then the Arkouda server uses Chapel to distribute the operations across multiple computer nodes for parallel execution.

A FAM dataset according to some examples of the present disclosure may differ from an Arkouda DataFrame in several ways. First, the index and column data of the FAM dataset may include data values from more than one data batch in the FAM 106. A second difference is that the FAM dataset storage manager 130 supports the creation of derived indexes and columns produced by applying operations to existing indexes and columns of a FAM dataset. Operations that produce new indexes, such as a filter operation or a sort operation, can lead to derived FAM datasets. For example, a filter operation or a sort operation applied on a first FAM dataset (which has a first index) can lead to production of a second FAM dataset that has a second index produced by filtering or sorting rows of the first FAM dataset. The filter operation or sort operation changes an ordering of the rows of the first FAM dataset, and as a result, causes a new index to be derived. In contrast, operations that use existing orderings of data to produce new column data (e.g., gather, scatter, subtraction, or addition) produce derived column(s). Such operations do not change the order of the rows of an existing FAM dataset.

FIG. 2 shows an example of a filter operation 206 that filters the FAM dataset 200 based on the following filtering condition: E>10,000. This filter operation 206 selects rows of the FAM dataset 200 with the attribute E that is greater than 10,000. A derived index 210 is the result produced by the filter operation. In the example of FIG. 2, the rows of the FAM dataset 200 that satisfy the filter condition are rows referred to by index values 3 and 6. As a result, the derived index 210 produced by the filter operation 206 includes index values 3 and 6. Note that because the filter operation 206 has filtered out index values before index value 3, between index values 3 and 6, and after index value 6, the order of the index values has changed (due to omission of index values present in the index 204), the index output by the filter operation 206 is a derived index.

In the example of FIG. 2, the filter operation 206 does not produce output columns. In other words, the filter operation 206 outputs just the derived index 210 and not columns of the rows referred to by the index values of the derived index 210.

Figure 3:
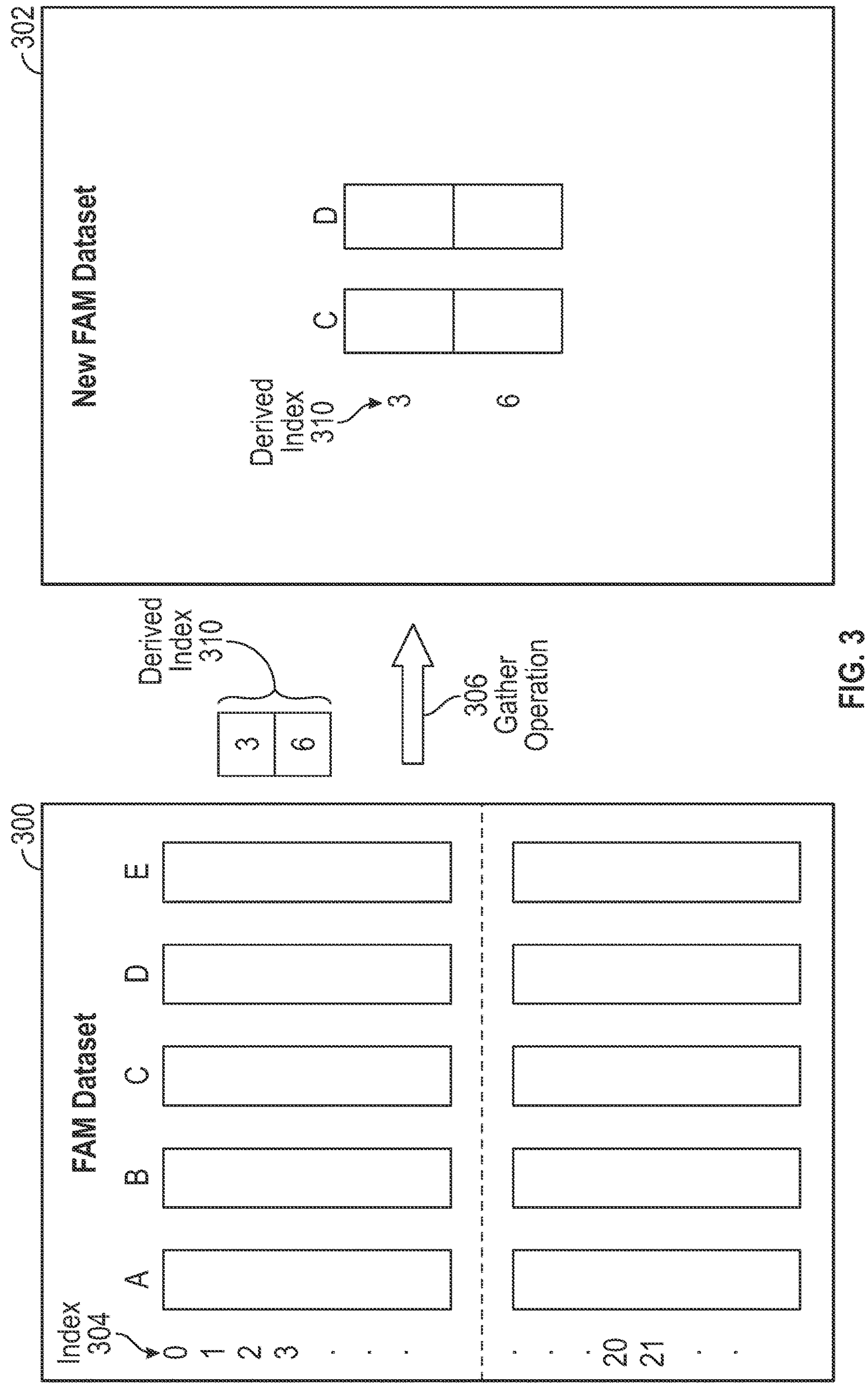

FIG. 3 shows an example of how a derived index 310 (e.g., the derived index 210 of FIG. 2) can be used to gather data (based on applying a gather operation 306) from an existing FAM dataset 300 (e.g., the FAM dataset 200 of FIG. 2) into a new FAM dataset 302. The existing FAM dataset 300 includes columns A, B, C, D, and E referred to by index values of an index 304 (which is similar to the index 204 of FIG. 2). The operation of FIG. 3 gathers attributes C and D of rows in the existing FAM dataset 300 referred to by the derived index 310 into the new FAM dataset 302. The gathered attributes C and D are derived columns produced by the gather operation 306. Note that the order of the derived index 310 is not changed by the gather operation 306.

Figure 4:
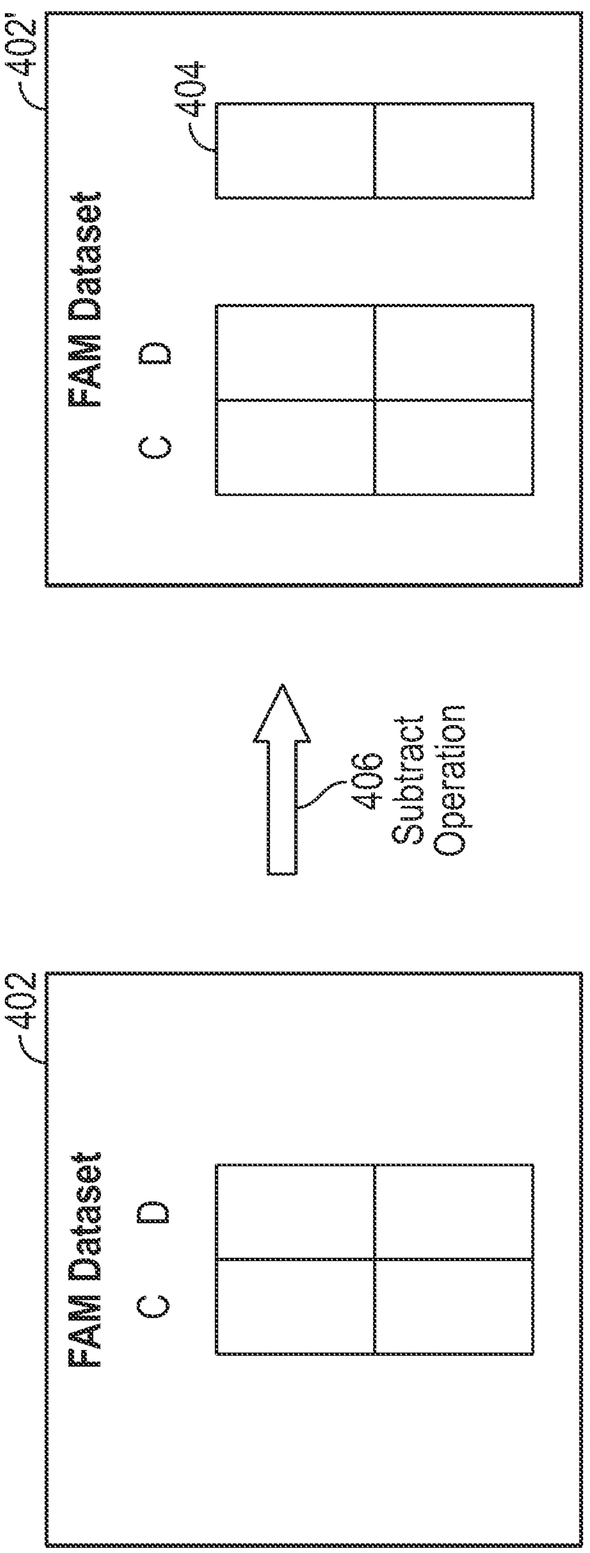

FIG. 4 shows an example of a subtraction operation 406 applied on a FAM dataset 402 (e.g., the FAM dataset 302 of FIG. 3) to derive a new column 404 that is added to the columns C and D of the FAM dataset 402. The FAM dataset with the new derived column 404 is represented as 402' in FIG. 4.

Generally, in accordance with some examples of the present disclosure, the FAM dataset storage manager 130 is able to provide the following functionalities. The FAM dataset storage manager 130 organizes data batches (e.g., 128 in FIG. 1) stored in a FAM region (e.g., 126-1 in FIG. 1) into one or more FAM datasets that are contained in a FAM dataset store (e.g., 136 in FIG. 1). The FAM dataset storage manager 130 supports creation of derived indexes and columns based on applying operations to existing FAM datasets. The results of the operations can include derived indexes (if the ordering of data is changed by the operations) or derived columns (if the ordering of data is not changed by the operations).

Figure 5:
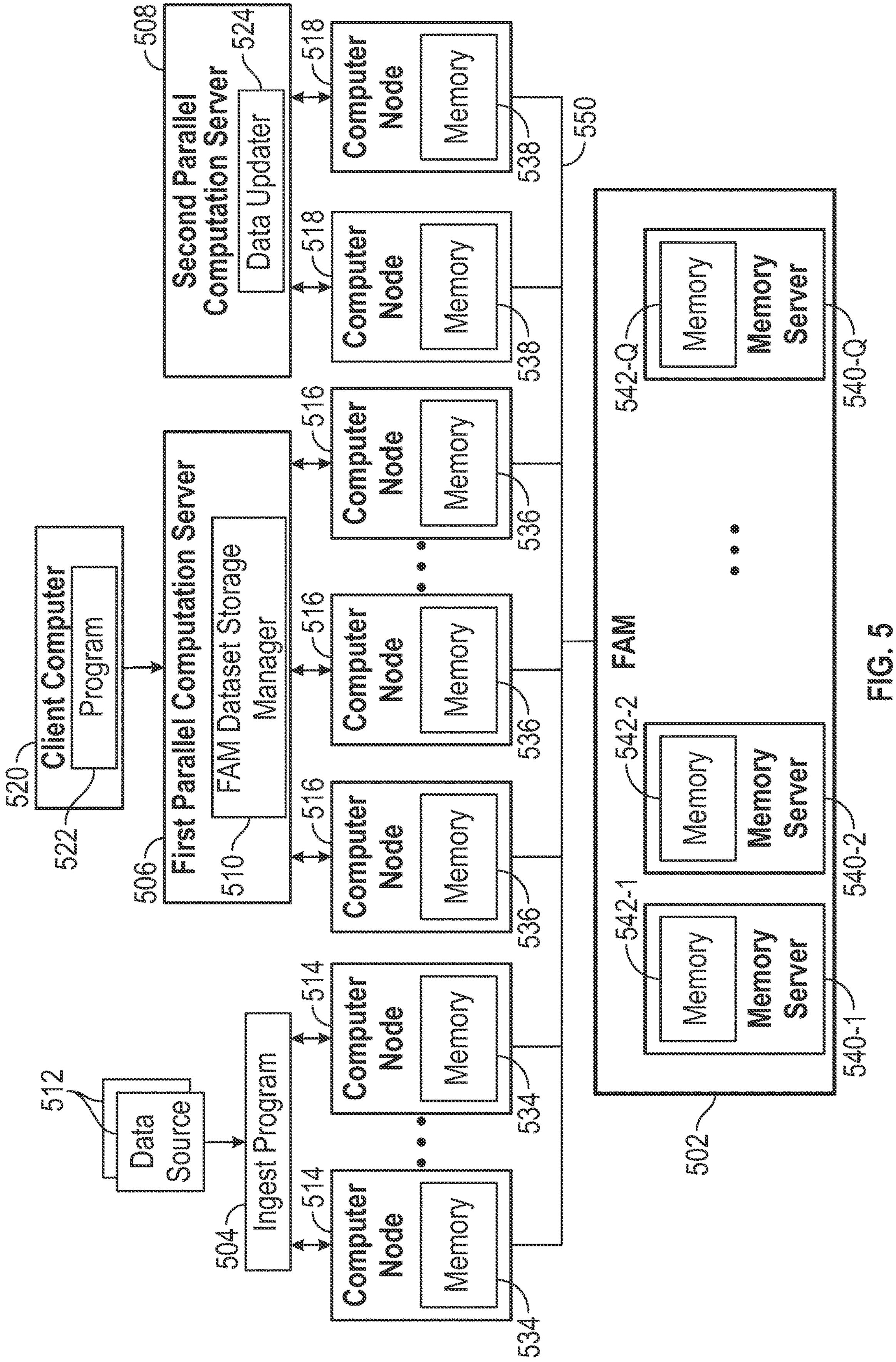
FIG. 5 is a block diagram of an arrangement including a client computer, multiple parallel computation servers executed on subsets of computer nodes, and a FAM, according to further examples.

Example Arrangement with Multiple Programs Running on Different Subsets of Computer Nodes FIG. 5 is a block diagram of multiple programs that have shared access of a FAM 502. The programs include an ingest program 504, a first parallel computation server 506, and a second parallel computation server 508. The first and second parallel computation servers 506 and 508 may be Arkouda servers, for example.

The ingest program 504 is executed on a first subset 514 of computer nodes. The first parallel computation server 506 is executed on a second subset 516 of computer nodes. The second parallel computation server 508 is executed on a third subset 518 of computer nodes. In some examples, the first, second, and third subsets 514, 516, and 518 of computer nodes are disjoint subsets that do not share any computer nodes. In further examples, the first, second, and third subsets 514, 516, and 518 of computer nodes can share one or more computer nodes.

The computer nodes include respective local memories. For example, the first subset 514 of computer nodes include respective local memories 534, the second subset 516 of computer nodes include respective local memories 536, and the third subset 518 of computer nodes include respective local memories 538.

The ingest program 504 receives data from various data sources 512 and ingests (writes) the received data to the FAM 502, such as to respective data batches in memory regions of the FAM 502. The ingest program 504 can be a Chapel program, for example, or a different type of program. The data sources 512 can include any or some combination of the following: a database, a web resource, a program executed on a remote computer, a machine, or any other entity capable of generating or outputting or forwarding data.

The ingest program 504 incrementally writes data to the FAM 502. "Incrementally" writing data to the FAM 502 refers to writing portions of data as the portions of data are received from the data sources 512. The data written to the FAM 502 are retrieved by the FAM dataset storage manager 510 into FAM datasets (e.g., 132-1 to 132-P in FIG. 1) to the local memories 536 of the second subset 516 of computer nodes. The FAM datasets the local memories 536 of the second subset 516 of computer nodes are accessible by the program 522 during an interactive programming session.

Based on an operation triggered by the program 522, the FAM dataset storage manager 510 retrieves data from a data batch in the FAM 502 into a FAM dataset across local memories 536 of computer nodes. In some examples, data ingested by the ingest program 504 can be stored in a single-dimension data array in the FAM 106. The single-dimension data array forms a data batch. In other examples, data can be ingested into multi-dimensional arrays in a data batch. In examples where a data batch includes a single-dimension data array, the FAM dataset storage manager 510 retrieves data from the single-dimension data array into the multiple columns of a FAM dataset, such as the FAM dataset 200 in FIG. 2.

Based on operations triggered by the program 522, new FAM datasets may be derived or existing FAM datasets may be updated (based on producing derived columns or derived indexes). Further operations can be triggered on the derived or updated FAM datasets, either by the programmer at the client computer 520 or by another programmer at another client computer that may interact with a FAM dataset storage manager of another parallel computation server (not shown).

FAM datasets (including existing FAM datasets and derived FAM datasets) can be shared by multiple programmers. The sharing of the FAM datasets is based on use of a common FAM (the FAM 502) to store data provided to the FAM datasets. Data of derived FAM datasets is written by the FAM dataset storage manager 510 to one or more data batches in the FAM 502. The data of the derived FAM datasets can be made available for use by other entities, including a programmer or any other entities. In some examples, a FAM dataset storage manager (e.g., 130 in FIG. 1 or 510 in FIG. 5) can write metadata to a data batch, to indicate whether the data batch (or a portion of the data batch) has been published for use by other entities, such as another FAM dataset storage manager with which another programmer is a participant in another interactive programming session, the data updater 524 of FIG. 5, or any other entity. The metadata can identify which entities are allowed access of data in the data batch.

The metadata can identify which data batches in the FAM 106 hold data for which columns and indexes of respective FAM datasets. For example, metadata can identify that data batches having identifiers IDx and IDy contain metadata for columns C and D of the FAM dataset 302 in FIG. 3.

Before an entity accesses data in a data batch containing data of a derived FAM dataset, the entity checks the metadata of the data batch to determine if the entity is allowed access-if not, the entity does not access the data in the data batch. The metadata can also indicate which portion (e.g., which derived indexes or derived columns) of the data batch is accessible. The entity would access just the indicated portion of the data batch.

The first parallel computation server 506 includes a FAM dataset storage manager 510 (which may be similar to the FAM dataset storage manager 130 of FIG. 1). A programmer at a client computer 520 (which may be similar to the client computer 102 of FIG. 1) can interact with the FAM dataset storage manager 510 to initiate operations with respect to data in the FAM 502. The initiated operations are operations requested by commands of lines of code in a program 522 being written at the client computer 520. The lines of code in the program 522 are executed during an interactive session with the first parallel computation server 506.

The second parallel computation server 508 includes an automated data updater 524 that incrementally updates data in the FAM 502. For example, the data updater 524 can incrementally update a derived FAM dataset. A discussion of the incremental updates performed by a data updater is provided further below.

In the example of FIG. 5, the FAM 502 includes multiple memory servers 540-1, 540-2, . . . , 540-Q, where Q≥2. A memory server 540-*i* (i=1 to Q) includes a processing resource (not shown) and a respective memory. For example, the memory server 540-1 includes a memory 542-1, the memory server 540-2 includes a memory 542-2, and the memory server 540-Q includes a memory 542-Q. The processing resource of the memory server 540-*i* includes one or more processors. The computer nodes (in the subsets 514, 516, and 518) are able to access the memory servers 540-1 to 540-Q over an interconnect 550.

Example Modules for Supporting FAM Dataset Storage Management

Figure 6:
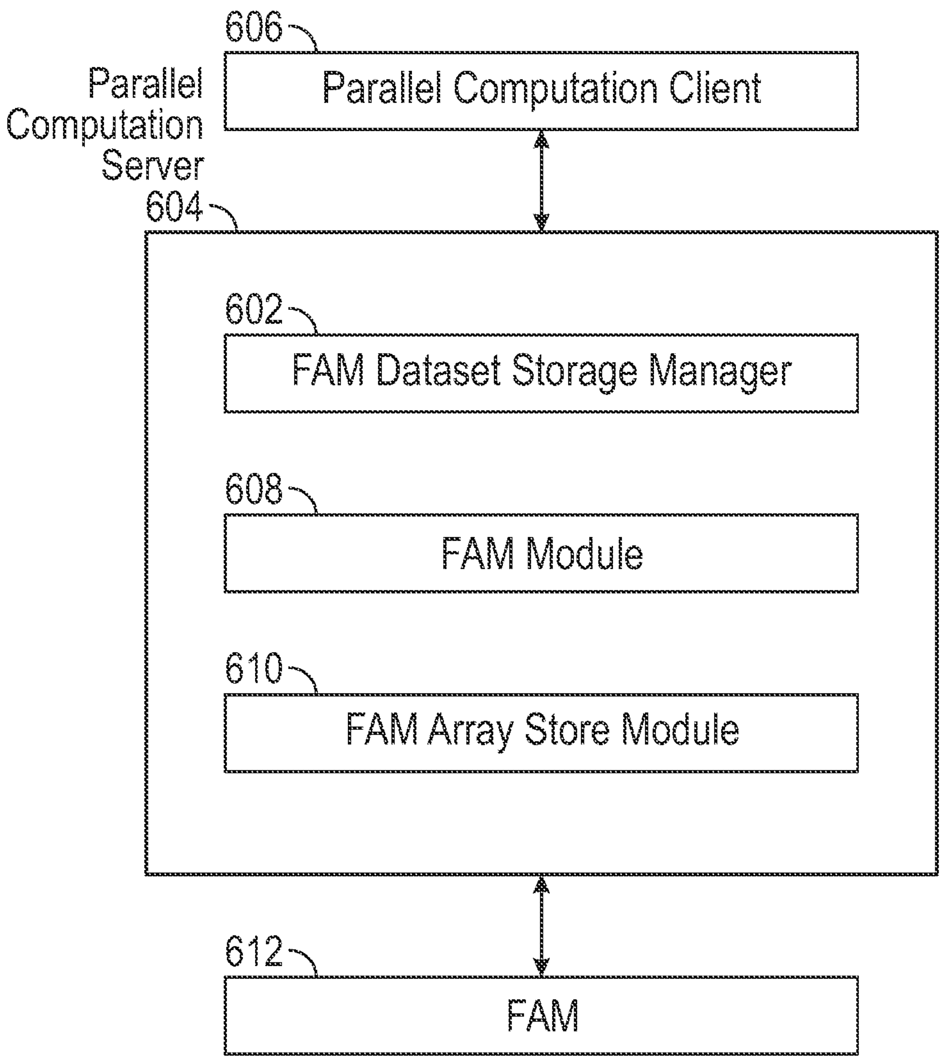
FIG. 6 is a block diagram of modules of a parallel computation server, according to some examples.

FIG. 6 shows various example modules to support FAM dataset storage management performed by a FAM dataset storage manager 602 (which can be the FAM dataset storage manager 130 in FIG. 1 or 508 in FIG. 5). A "module" can refer to machine-readable instructions to perform specified tasks.

The FAM dataset storage manager 602 is part of a parallel computation server 604 (which can be the parallel computation server 104 in FIG. 1 or 510 in FIG. 5). A parallel computation client 606 (which can be the program 110 in FIG. 1 or 522 in FIG. 5) can be provided in a client computer (e.g., 102 in FIG. 1 or 520 in FIG. 5) to issue commands to the parallel computation server 604).

The FAM dataset storage manager 602 uses built-in capabilities of a programming language such as Chapel to distribute operations invoked by the parallel computation client 606 across multiple computer nodes for parallel execution. The FAM dataset storage manager 602 operates in its role as a server (e.g., an Arkouda server) with respect to the parallel computation client 606, and operates in its role as a client (e.g., a FAM client) with respect to a FAM 612.

In some examples, the parallel computation server 604 may further include a FAM module 608 and a FAM array store module 610. The FAM module 608 enables the parallel computation server 604 to invoke FAM operations to access the FAM 612. The FAM module 608 presents a FAM programming interface to the FAM dataset storage manager 602. The FAM dataset storage manager 602 accesses the FAM programming interface to perform various operations with respect to the FAM 612. In some examples, the FAM programming interface presented by the FAM module 608 includes an API that has functions invocable by the FAM dataset storage manager 602 executed on computer nodes to manage or access the FAM 612. An example of such an API is an OpenFAM API to support OpenFAM operations.

The FAM dataset storage manager 602 is executable across multiple computer nodes (such as the computer nodes 120-1 to 120-N of FIG. 1 or the computer nodes of the subset 516 of computer nodes of FIG. 5). More generally, the FAM dataset storage manager 602 is executable across multiple processing locales. As noted above, a processing locale refers to any distinct computation partition, such as a computer node or a portion of the computer node.

The FAM dataset storage manager 602 executes across multiple processing locales by running multiple instances of the FAM dataset storage manager 602 in the respective processing locales. Each instance of the FAM dataset storage manager 602 is a process entity that runs in a corresponding processing locale.

In some examples, because the FAM module 608 is not responsible for managing the distribution of operations across processing locales, the instance of the FAM dataset storage manager 602 running in a given processing locale ensures that addresses (e.g., virtual addresses) of remote memory access (RMA) operations issued to the FAM 612 from the instance of the FAM dataset storage manager 602 are addresses within the address space of the given processing locale. Since a first instance of the FAM dataset storage manager 602 is restricted to using the address space of a first processing locale when accessing the FAM 612, the first instance of the FAM dataset storage manager 602 would be unable to write data in the address space of a second processing locale to the FAM 612.

The distribution of data across processing locales (such as to local memories of computer nodes) is handled by the FAM array store module 610. As noted above, a column of a FAM dataset (such as any of the columns A, B, C, D, and E of the FAM dataset 200 shown in FIG. 2) can be arranged as a pdarray object. The FAM array store module 610 is able to distribute a pdarray object across multiple processing locales.

The FAM array store module 610 is able to convert operations on the pdarray objects into FAM-specific accesses of the FAM 612. When an operation is invoked that executes across multiple processing locales, the multiple processing locales are assigned respective portions of data in the FAM 106 for processing. In other words, a first portion of the operation executing on a first processing locale is assigned a first portion of data in the FAM 106 for processing, and a second portion of the operation executing on a second processing locale is assigned a second portion of data in the FAM 106 for processing. As an example, the FAM array store module 610 can partition data in the FAM 106 evenly across the multiple processing locales for processing. For example, if data in the FAM 612 has 100 data elements that are to be distributed across two processing locales, then the FAM array store module 610 can place 50 elements per processing locale.

In some examples, if there are multiple memory regions (e.g., 126-1 to 126-M in FIG. 1), then one instance of the FAM array store module 610 may be provided per memory region.

The FAM dataset storage manager 602, the FAM module 608, and the FAM array store module 610 allow a programmer (e.g., 108 in FIG. 1) to create, access, and manipulate data stored in a FAM without having to be familiar with details associated with accessing and storing data in the FAM 106. The logistics of moving data between the local memories of computer nodes and the FAM are handled by the FAM module 608, and the FAM array store module 610, and the FAM dataset storage manager 602 manages the distribution of operations on data across multiple processing locales.

Incremental Updates of Derived FAM Datasets

Figure 7:
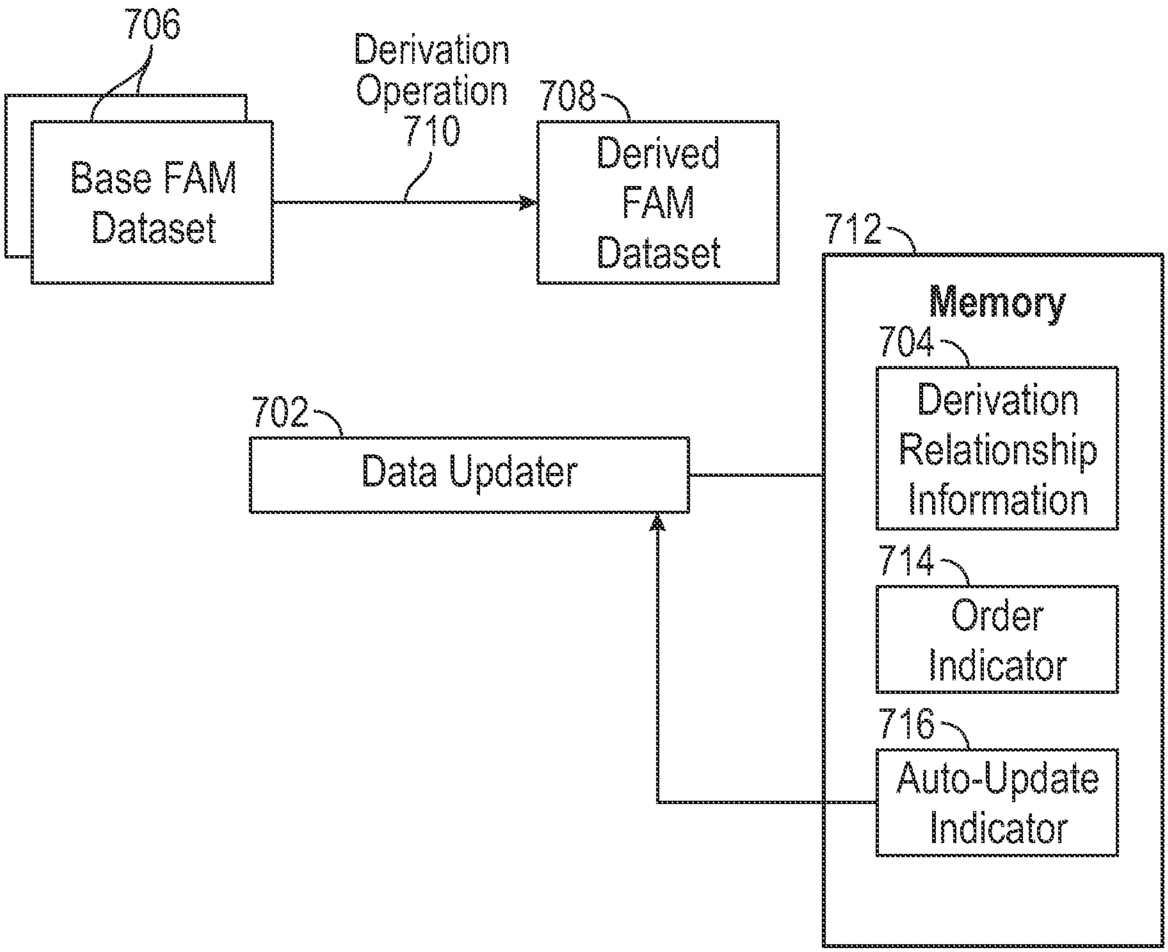
FIG. 7 is a block diagram of an arrangement including an incremental data updater, according to some examples.

Referring to FIG. 7, in some examples, a data updater 702 (which can be data updater 524 of FIG. 5, for example) is able to incrementally update derived FAM datasets including one or both of derived indexes and derived columns. To support incremental processing of derived FAM datasets as updates to underlying base data (data of existing FAM datasets from which derived FAM datasets are generated), the data updater 702 can store derivation relationship information 704 that specifies derivation relationships between base FAM datasets and derived FAM datasets. A "base" FAM dataset is a FAM dataset on which a derivation operation is applied to produce a result in the form of a derived FAM dataset. A "derivation operation" is an operation that derives a FAM dataset including either a new index or a new column.

Note that a base FAM dataset can include a FAM dataset directly populated with data from the FAM, or alternatively, the base FAM dataset may be another derived FAM dataset formed by another derivation operation.

The derivation relationship information 704 specifies which base FAM dataset(s) 706 is (are) used to produce a derived FAM dataset 708 based on application of a derivation operation 710 on the base FAM dataset(s) 706. The derivation relationship can specify a sequence of derivation operations that can be applied on multiple levels of FAM datasets. For example, a first derivation operation is applied on a base FAM dataset to form a first derived FAM dataset, and a second derivation operation is applied on the first derived FAM dataset to form a second derived FAM dataset.

The derivation relationship information 704 can be stored in a memory 712, which can be any of the local memories 122-1 to 122-N in FIG. 1 or 536 in FIG. 6. Additionally, the data updater 702 can distinguish between order-preserving derivation operations and order-destroying derivation operations that create derived FAM datasets. As discussed further above, filter operation and sort operations are examples of operations that change an ordering of the rows of an existing FAM dataset; these types of operations are order-destroying derivation operations. In contrast, gather, scatter, subtraction, and addition operations are examples of operations that do not change the order of an existing FAM dataset; these types of operations are order-preserving operations.

The tracking can be accomplished by storing, by the data updater 702, an order indicator 714 (e.g., a flag or parameter) specifying whether a derivation operation is an order-preserving derivation operation or an order-destroying derivation operation.

An order-preserving derivation operation operate on a per batch basis; in other words, the ingestion of new data into a data batch corresponding to a FAM dataset does not impact previously computed results of a derived FAM dataset. For example, it is simple to update a derived index or a derived column in response to the ingestion of new data to a data batch because the new data can be processed and simply appended to existing results in the derived FAM dataset.

On the other hand, because an order-destroying operation such as a sort operation scatters data throughout results in a derived FAM dataset, new data ingested into a data batch cannot simply be appended to results of the derived FAM dataset, because the new data would have to be re-sorted with the data in the results of the derived FAM dataset. More generally, when new data is ingested that affects results of a derived FAM dataset produced by an order-destroying operation, the computations of the order-destroying operation would have to be applied collectively on the new data as well as the data in the results of the derived FAM dataset.

Using the order indicator 714 specifying whether the derivation operation 710 that produced the derived FAM dataset 708 is an order-preserving derivation operation or an order-destroying derivation operation, the data updater 702 can intelligently determine as part of an incremental update of the derived FAM dataset 708 whether (1) the derivation operation 710 can be applied on newly ingested data and the results appended to the derived FAM dataset 708, or (2) the derivation operation 710 is to be applied collectively on the newly ingested data as well as data in the results of the derived FAM dataset 708. The incremental update is performed in response to the data updater 702 receiving an indication from the FAM that new data has been ingested.

The ability to incrementally update derived FAM datasets allows programmers in interactive programming sessions to apply operations on large datasets that may have a total size exceeding the combined storage capacity of local memories of computer nodes. For such a large dataset, segments of the large dataset can be incrementally ingested into the FAM 106 and incremental updates are applied to derived FAM datasets, where a segment of the large dataset incrementally ingested into the FAM 106 can fit within the combined storage capacity of local memories of computer nodes.

As derived FAM dataset are incrementally updated, corresponding metadata associated with the derived FAM dataset are also updated by the data updater 702.

The incremental update can be set to be performed automatically by the data updater 702 in some examples. For example, an auto-update indicator 716 can be stored in the memory 712 to indicate whether or not an incremental update is to be applied in response to a change in a base FAM dataset. If the auto-update indicator 716 is set to a first value, the data updater 702 would automatically apply an incremental update when a change in the base FAM dataset occurs. On the other hand, if the auto-update indicator 716 is set to a different second value, the data updater 702 would not apply an incremental update when a change in the base FAM dataset occurs. The auto-update indicator 716 can be set by a programmer, for example.

Further Examples

Figure 8:
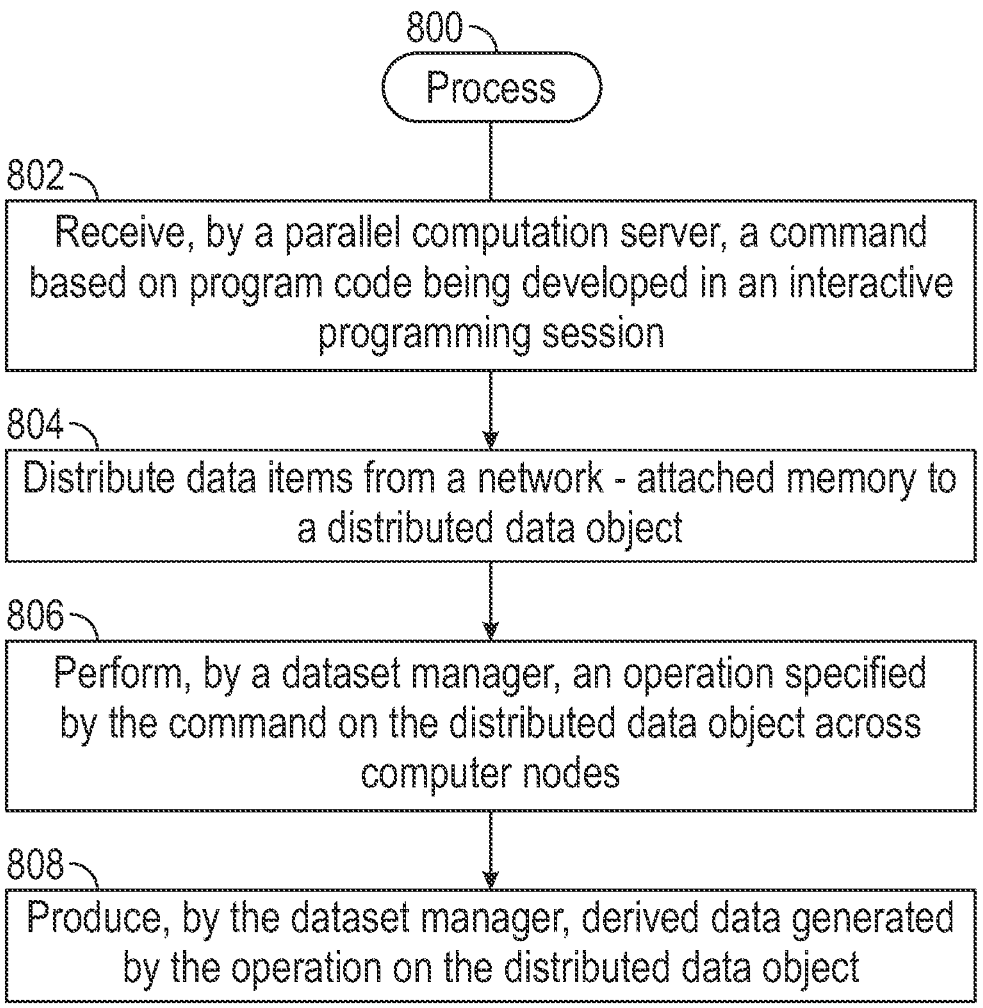
FIG. 8 is a flow diagram of a process according to some examples.

FIG. 8 is a flow diagram of a process 800 according to some examples of the present disclosure. The process 800 may be performed by a parallel computation server, such as 104 in FIG. 1, 506 in FIG. 5, or 604 in FIG. 6.

The process 800 includes receiving (at 802), by the parallel computation server executed in a system including a plurality of computer nodes, a command based on program code of a program being developed in an interactive programming session. An "interactive programming session" refers to a session associated with developing a program in which lines of code of the program are executed as the program is being developed.

The process 800 includes distributing (at 804) data items from a network-attached memory to a distributed data object including data in node memories of the plurality of computer nodes. An example of the network-attached memory is the FAM 106 in FIG. 1, the FAM 502 in FIG. 5, or the FAM 612 in FIG. 6. A "data item" refers to any unit of data, such as in the form of a data batch or any other unit of data. A "distributed data object" refers to a data object that has multiple portions stored in different node memories. A "node memory" refers to a memory of a computer node, where the memory can be part of the computer node or can be separate but accessible by the computer node.

The process 800 includes performing (at 806), by a dataset manager executed in the system, an operation specified by the command on the distributed data object, the operation executed in parallel on the plurality of computer nodes. An operation executed in parallel on computer nodes refers to applying the operation on different portions of the distributed data object on respective different computer nodes. A dataset manager refers to machine-readable instructions that manage the retrieval of data from the network-attached memory, the distribution of the distributed data object across computer nodes, and the application of operations to the distributed data object to produce derived data.

The process 800 includes producing (at 808), by the dataset manager in the system, derived data generated by the operation on the distributed data object, the derived data accessible by the programmer in the interactive programming session. "Derived data" refers to data generated by a computation applied on other data. The derived data being "accessible" by the programmer refers to the programmer being able to add lines of code to operate on the derived data.

In some examples, the data items on which the operation is applied are part of a data array stored in the network-attached memory, the data array having a total size greater than a memory capacity of any of the node memories of the plurality of computer nodes.

In some examples, the process 800 includes storing, by the dataset manager, the derived data in the network-attached memory, and sharing the derived data stored in the network-attached memory with another programmer in another interactive programming session.

In some examples, the process 800 includes receiving, by an ingest program executed in the system, further data, storing, by the ingest program, the further data as further data items in the network-attached memory, and incrementally updating the derived data based on the further data items. For example, the incremental update can be performed by the data updater 524 in FIG. 5 or the data updater 702 in FIG. 7.

In some examples, the process 800 includes receiving, by the dataset manager, an indication that an automatic update of the derived data is to be performed. An example of the indication is the auto-update indicator 716 of FIG. 7. The incremental update of the derived data is responsive to the indication.

In some examples, the incremental update is performed by a data updater executed on a further computer node that is different from the plurality of computer nodes on which the dataset manager executes.

In some examples, the distributed data object is part of a dataset, and the process 800 includes setting, by the dataset manager, metadata associated with the dataset, the metadata indicating that the dataset is published for access by another dataset manager associated with another programmer in another interactive programming session.

In some examples, the distributed data object is part of a dataset, and the derived data includes indexes of rows of the dataset that satisfy a condition. The condition may be a filter condition specified by the filter operation 206 of FIG. 2, for example.

In some examples, the distributed data object is part of a dataset, and the derived data includes derived column data of the dataset, the derived column data produced by the operation on one or more columns of the dataset. An example of the derived column data is the derived column 404 in FIG. 4.

In some examples, the program code of the interactive programming session contains a further command including a class referring to the distributed data object. An example of the class is a data array class referred to further above.

In some examples, the process 800 includes presenting a programming interface including functions accessible by the dataset manager to access data in the network-attached memory. The programming interface can be an API presented by the FAM module 608 of FIG. 6, for example.

In some examples, the process 800 includes presenting, by the dataset manager, data of the data items to the programmer in column format. The data of the data items are included in multiple columns of a FAM dataset, for example.

Figure 9:
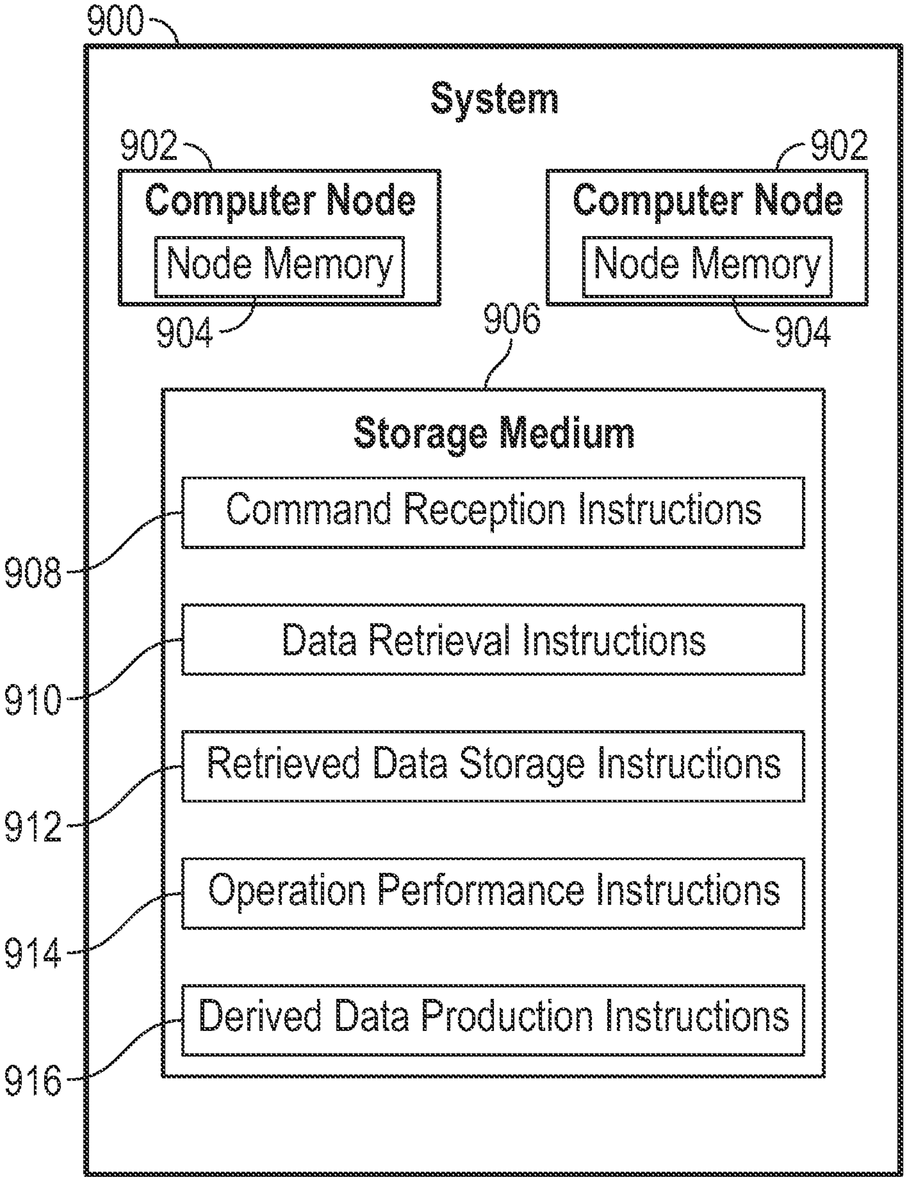
FIG. 9 is a block diagram of a system according to some examples.

FIG. 9 is a block diagram of a system 900 including a plurality of computer nodes 902 that have corresponding node memories 904. The system 900 further includes a storage medium 906 storing machine-readable instructions executable on at least one of the plurality of computer nodes 902 to perform various tasks.

The machine-readable instructions include command reception instructions 908 to receive a command based on program code of a program being developed in an interactive programming session. An "interactive programming session" refers to a session associated with developing a program in which lines of code of the program are executed as the program is being developed.

The machine-readable instructions include data retrieval instructions 910 to, based on the command, retrieve data from a network-attached memory over an interconnect to the plurality of computer nodes. The machine-readable instructions include retrieved data storage instructions 912 to store the retrieved data in a distributed data object distributed across the node memories. A "distributed data object" refers to a data object that has multiple portions stored in different node memories.

The machine-readable instructions include operation performance instructions 914 to perform, by a dataset manager, an operation specified by the command on the distributed data object, the operation executed in parallel on the plurality of computer nodes. An operation executed in parallel on computer nodes refers to applying the operation on different portions of the distributed data object on respective different computer nodes.

The machine-readable instructions include derived data production instructions 916 to produce, by the dataset manager, derived data generated by the operation on the distributed data object, the derived data accessible by the programmer in the interactive programming session. "Derived data" refers to data generated by a computation applied on other data. The derived data being "accessible" by the programmer refers to the programmer being able to add lines of code to operate on the derived data.

Figure 10:
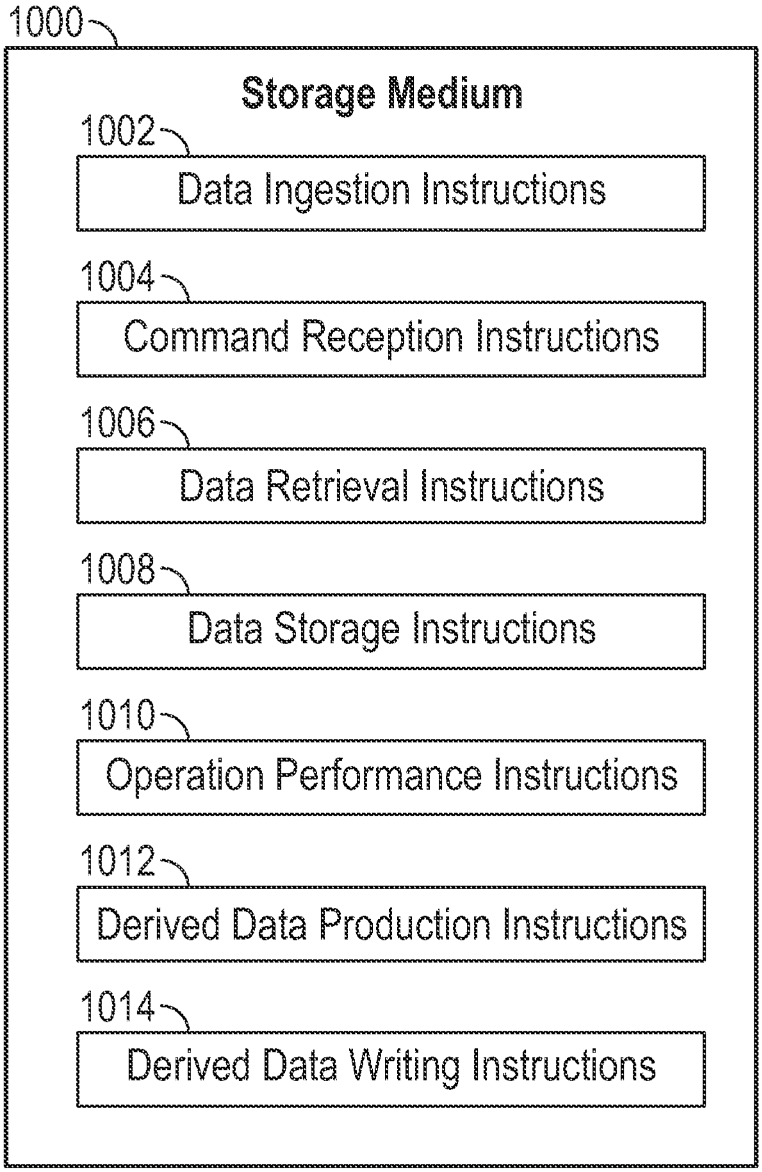
FIG. 10 is a block diagram of a storage medium storing machine-readable instructions according to some examples.

FIG. 10 is a block diagram of a non-transitory machine-readable or computer-readable storage medium 1000 storing machine-readable instructions executable on a system to perform various tasks. The system can include a plurality of computer nodes.

The machine-readable instructions include data ingestion instructions 1002 to ingest, from a data source, data into a network-attached memory. "Ingesting" data can refer to receiving the data and writing the data to a target storage.

The machine-readable instructions include command reception instructions 1004 to receive a command based on an interpretation of program code of a program being developed at a client computer in an interactive programming session. "Interpreting" program code refers to converting the program code into a form that can be executed by a machine, without having to compile the program code.

The machine-readable instructions include data retrieval instructions 1006 to, based on the command, retrieve the data from the network-attached memory over an interconnect to the plurality of computer nodes. The machine-readable instructions include retrieved data storage instructions 1008 to store the retrieved data in a distributed data object distributed across node memories of the plurality of computer nodes.

The machine-readable instructions include operation performance instructions 1010 to perform, by a dataset manager, an operation specified by the command on the distributed data object, the operation executed in parallel on the plurality of computer nodes. An operation executed in parallel on computer nodes refers to applying the operation on different portions of the distributed data object on respective different computer nodes.

The machine-readable instructions include derived data production instructions 1012 to produce, by the dataset manager, derived data generated by the operation on the distributed data object, the derived data accessible by the programmer in the interactive programming session.

The machine-readable instructions include derived data writing instructions 1014 to write the derived data to the network-attached memory, the derived data in the network-attached memory accessible by another programmer. The other programmer may access the derived data using another dataset manager, for example.

A storage medium (e.g., 906 in FIG. 9 or 1000 in FIG. 10) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:

receiving, at a system comprising a plurality of computer nodes in an interactive programming session, a command based on program code of a program being developed in the interactive programming session;

allocating, by the system, a subset of computer nodes from the plurality of computer nodes based on an operation specified by the command;

triggering, by the system, the operation on the subset of computer nodes;

distributing, by the system for the operation, data items from a network-attached memory to a distributed data object comprising data arranged as a first dataset in node memories of the subset of computer nodes;

performing, by a dataset manager executed in the system, the operation on the distributed data object, the operation executed in parallel across computer nodes of the subset of computer nodes;

setting, by the dataset manager in the system, a value of an order indicator stored in a node memory in the plurality of computer nodes, the order indicator settable to different values to indicate whether the operation is an order-preserving derivation operation or an order-destroying derivation operation, wherein the order-preserving derivation operation does not change an order of rows of the first dataset, and the order-destroying derivation operation changes the order of rows of the first dataset; and producing, by the system based on a value of the order indicator, derived data of a derived dataset generated by the operation on the distributed data object, the derived data accessible by a programmer in the interactive programming session.

2. The method of claim 1, wherein the data items on which the operation is applied are part of a data array stored in the network-attached memory, the data array having a total size greater than a memory capacity of any of the node memories of the plurality of computer nodes.

3. The method of claim 1, further comprising:

storing, by the dataset manager, the derived data in the network-attached memory; and sharing the derived data stored in the network-attached memory with another programmer in another interactive programming session.

4. The method of claim 1, further comprising:

receiving, by an ingest program executed in the system, further data;

storing, by the ingest program, the further data as further data items in the network-attached memory; and incrementally updating the derived data based on the further data items.

5. The method of claim 4, further comprising:

receiving, by the dataset manager, an indication that an automatic update of the derived data is to be performed, wherein the incremental update of the derived data is responsive to the indication.

6. The method of claim 1, wherein the distributed data object is part of a dataset, the method further comprising:

setting, by the dataset manager, metadata associated with the derived dataset, the metadata indicating that the derived dataset is published for access by another dataset manager associated with another programmer in another interactive programming session.

7. The method of claim 1, wherein the producing of the derived data of the derived dataset generates a derived index based on the order indicator being set to the value indicating that the operation is the order-destroying operation, the derived index referring to a row in the derived dataset.

8. The method of claim 7, wherein the first dataset is arranged as rows and columns, and the derived dataset includes derived indexes but not any output column, the derived indexes referring to respective rows of the derived dataset.

9. The method of claim 1, wherein the producing of the derived data of the derived dataset generates a new column based on the order indicator being set to the value indicating that the operation is the order-preserving operation, the new column including column data produced by the operation on one or more columns of the first dataset.

10. The method of claim 1, wherein the program code of the interactive programming session contains a further command comprising a class referring to the distributed data object.

11. The method of claim 1, further comprising:

presenting a programming interface comprising functions accessible by the dataset manager to access data in the network-attached memory.

12. The method of claim 1, wherein the program code comprises a plurality of lines of code, the method further comprising:

sending, to the system, a first command for a first line of code of the plurality of lines of code, the first command specifying a first operation relating to the network-attached memory; and sending, to the system, a second command for a second line of code of the plurality of lines of code, the second command specifying a second operation relating to the network-attached memory.

13. The method of claim 1, further comprising:

writing, by the dataset manager, metadata along with the derived data to the network-attached memory, the metadata identifying which entities are permitted access to the derived data, and the programmer having access to the derived data based on the metadata.

14. A system comprising:

a plurality of computer nodes comprising node memories;

a non-transitory storage medium comprising instructions executable on at least one of the plurality of computer nodes to:

receive a command based on program code of a program being developed in an interactive programming session;

allocate a subset of computer nodes from the plurality of computer nodes based on an operation specified by the command;

trigger the operation on the subset of computer nodes;

based on the command, retrieve data from a network-attached memory over an interconnect to the plurality of computer nodes;

store the retrieved data arranged as a first dataset in a distributed data object distributed across the node memories of the subset of computer nodes;

perform, by a dataset manager, the operation on the distributed data object, the operation executed in parallel across computer nodes of the subset of computer nodes;

set, by the dataset manager, a value of an order indicator stored in a node memory in the plurality of computer nodes, the order indicator settable to different values to indicate whether the operation is an order-preserving derivation operation or an order-destroying derivation operation, wherein the order-preserving derivation operation does not change an order of rows of the first dataset, and the order-destroying derivation operation changes the order of rows of the first dataset;

produce, based on a value of the order indicator, derived data of a derived dataset generated by the operation on the distributed data object, the derived data accessible by a programmer in the interactive programming session.

15. The system of claim 14, wherein the distributed data object is a first distributed data object including a first portion of the retrieved data, and wherein the instructions are executable on the at least one of the plurality of computer nodes to:

store a second portion of the retrieved data in a second distributed data object distributed across the node memories of the subset of computer nodes, wherein the operation is performed by the dataset manager on the first distributed data object and the second distributed data object.

16. The system of claim 15, wherein the instructions are executable on the at least one of the plurality of computer nodes to:

arrange the retrieved data as columns in the first dataset stored in the node memories of the subset of computer nodes, the columns comprising a first column including data of the first distributed data object, and a second column including data of the first distributed data object.

17. The system of claim 14, wherein the producing of the derived data of the derived dataset generates a derived index based on the order indicator being set to the value indicating that the operation is the order-destroying operation, the derived index referring to a row in the derived dataset.

18. The system of claim 14, wherein the producing of the derived data of the derived dataset generates a new column based on the order indicator being set to the value indicating that the operation is the order-preserving operation, the new column including column data produced by the operation on one or more columns of the first dataset.

19. A non-transitory machine-readable storage medium storing instructions that upon execution by one or more hardware processors cause a system to:

ingest, from a data source, data into a network-attached memory;

receive a command based on an interpretation of program code of a program being developed at a client computer in an interactive programming session;

allocate a plurality of computer nodes based on an operation specified by the command;

trigger the operation on the plurality of computer nodes;

based on the command, retrieve the data from the network-attached memory over an interconnect to the plurality of computer nodes;

store the retrieved data as a first dataset in a distributed data object distributed across node memories of the plurality of computer nodes;

perform, by a dataset manager, the operation on the distributed data object, the operation executed in parallel on the plurality of computer nodes;

set, by the dataset manager, a value of an order indicator stored in a node memory of a computer node of the plurality of computer nodes, the order indicator settable to different values to indicate whether the operation is an order-preserving derivation operation or an order-destroying derivation operation, wherein the order-preserving derivation operation does not change an order of rows of the first dataset, and the order-destroying derivation operation changes the order of rows of the first dataset;

produce, based on a value of the order indicator, derived data of a derived dataset generated by the operation on the distributed data object, the derived data accessible by a programmer in the interactive programming session; and write the derived data to the network-attached memory, the derived data in the network-attached memory accessible by another programmer.

20. The non-transitory machine-readable storage medium of claim 19, wherein the producing of the derived data of the derived dataset generates a derived index based on the order indicator being set to the value indicating that the operation is the order-destroying operation, the derived index referring to a row in the derived dataset.

* * * * *